May 25, 1926.

E. J. KOHMAN

CLUTCH

Filed Jan. 29, 1924

Inventor
Ernest J. Kohman

By
Attorney

May 25, 1926.
E. J. KOHMAN
CLUTCH
Filed Jan. 29, 1924
1,585,996
2 Sheets-Sheet 2
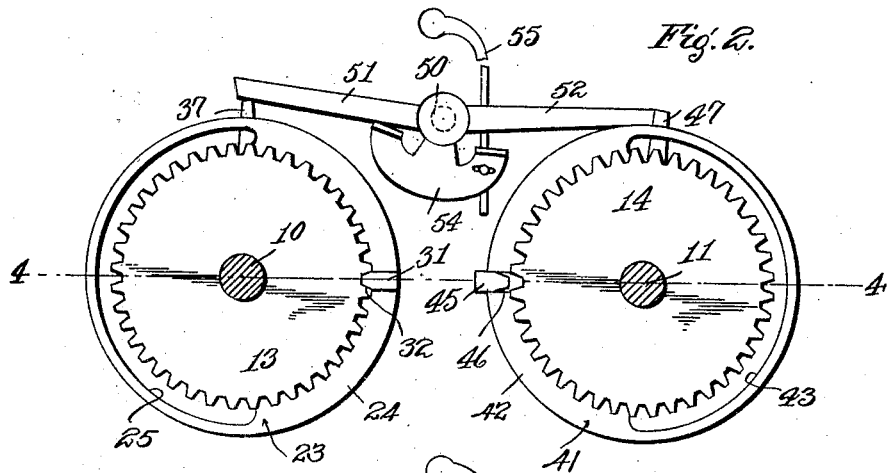
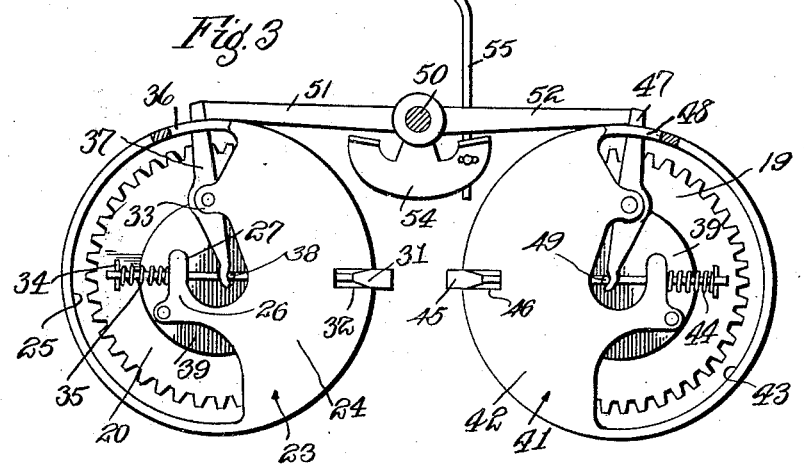
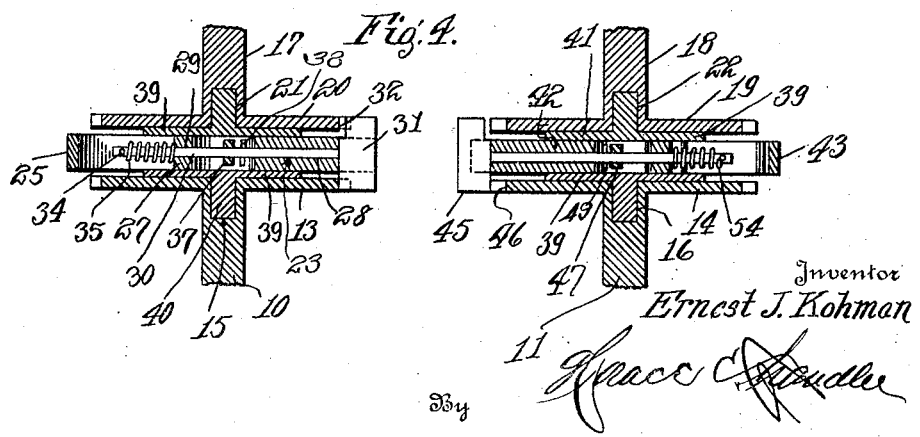
Inventor
Ernest J. Kohman
By
Attorney Patented May 25, 1926.

1,585,996

UNITED STATES PATENT OFFICE.

ERNEST J. KOHMAN, OF DILLON, KANSAS.

CLUTCH.

Application filed January 29, 1924. Serial No. 689,286.

This invention relates to new and useful improvements in clutches, and particularly to clutches adapted for use in connection with the current generating mechanisms shown and described in my Patent No. 1,472,873, issued November 6, 1923.

One object of the invention is to provide an automatic clutch for coupling a drive and driven shaft together.

Another object is to provide a device of this character which includes a constantly moving drive shaft, a normally stationary driven shaft, with automatic means for coupling the shafts together.

A further object is to provide a device of this character which includes two mechanisms normally inactive, with clutching means normally held out of operative position, and automatic means for releasing the holding means to permit one or the other of the mechanisms to function.

Other objects and advantages will be apparent from the following description when taken in connection with the accompanying drawings.

In the drawings:

Figure 2 is a vertical transverse sectional view on the line 2—2 of Figure 1.

Figure 3 is an enlarged vertical sectional view on the line 3—3 of Figure 1, just inwardly of the drive member of the clutch.

Figure 4 is an enlarged transverse sectional view on the line 4—4 of Figure 2.

Figure 1:
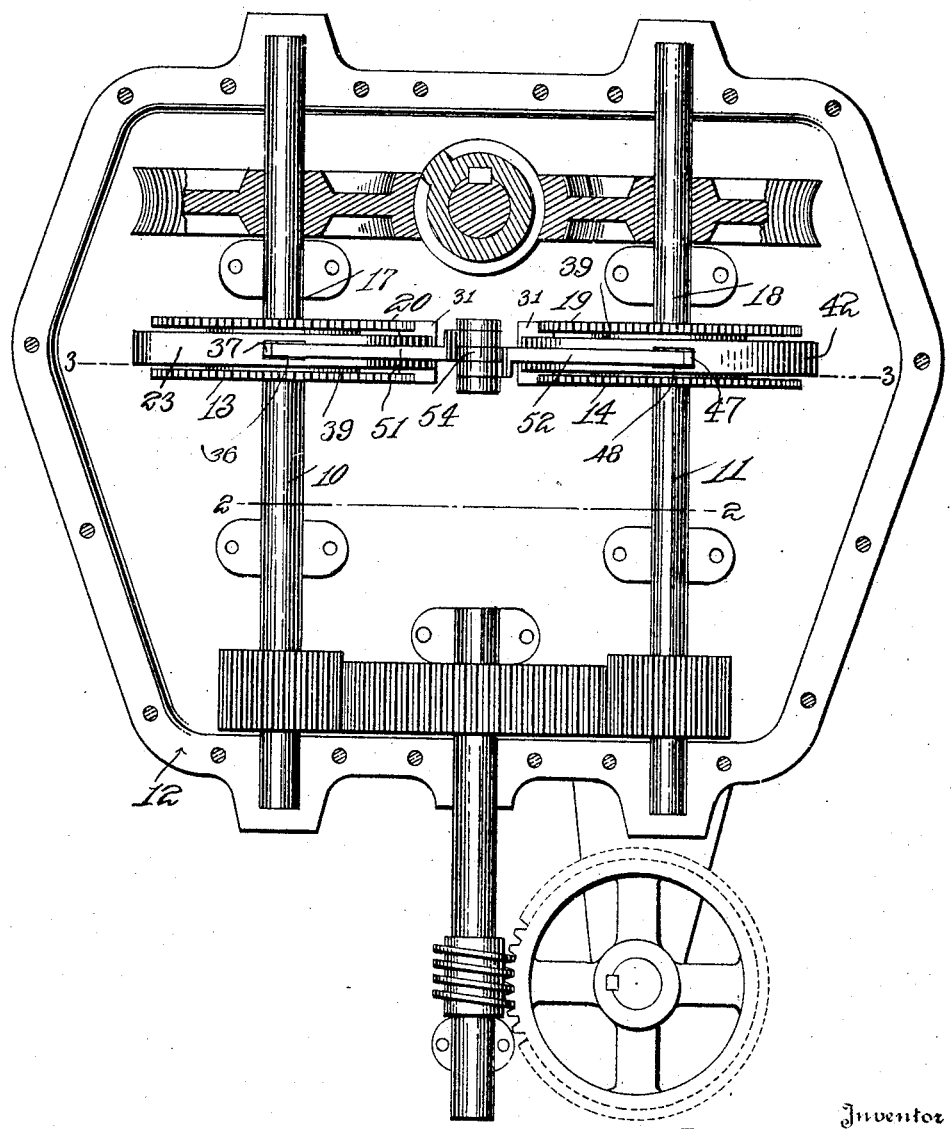
Figure 1 is a plan view of the mechanism with which the clutches are associated.

Referring particularly to the accompanying drawings, 10 and 11 represent a pair of parallel drive shafts having their outer ends supported in the end of the casing 12. The other ends, respectively of the shafts 10 and 11, are the peripherally toothed wheels 13 and 14, the said ends being centrally formed with the sockets 15 and 16. Rotatably supported in the other end of the casing are the outer ends of the driven shafts 17 and 18, the former alining with the shaft 10, and the latter alining with the shaft 11, the shaft 17 having a peripherally toothed wheel 20 on its inner end, while the shaft 18 has a toothed wheel 19, on its inner end. The wheel 14 is disposed in parallel relation to the wheel 19, while the wheel 13 is disposed in parallel relation to the wheel 20. The inner ends of the shafts 17 and 18 are respectively formed with the central sockets 21 and 22.

Disposed between the wheels 13 and 20 is a disk 23, which has a solid portion 24 and an open ring portion 25. Formed on the inner edge face of the solid portion 24, and projecting toward the ring portion, is a curved finger 26, and formed on the outer face of the end of this finger are the apertured lugs 27. Formed through the solid portion 24, radially of the disk, is an opening 28, and through the lugs 27 of the finger 26 is an opening 29 alining with the opening 28, to slidably receive the stem 30, of the coupling block 31, which block is mounted on the outer end of the stem and moves radially within the peripheral notch 32 formed in the disk 23 at the outer end of the opening 28, and also in the spaces between the teeth of the wheels 13 and 20. Also formed in the same edge face of the solid portion 24 but adjacent the ring portion, are the parallel apertured lugs 33. The inner end of the stem 30 extends to a point adjacent the ring portion of the disk, and has a transverse pin 34, which retains the adjacent end of the coil spring 35, carried by the said stem, the other end of the spring bearing against the outer face of the finger 26. Formed through the ring portion, adjacent the lugs 33, is an angular elongated opening 36, and projecting through this opening is the outer end of the lever 37, which is pivotally mounted between said lugs 33. The inner end of the lever 37 is bifurcated and straddles the stem 30, and engages with the transverse pin 38 disposed through the stem. The spring 35 normally urges the stem inwardly to engage the end portions of the block 31 between the teeth of the opposite wheels, or the wheels at opposite sides of the disk. Secured to the opposite faces of the disk are the smaller disks 39, which have the outwardly extending central trunnions 40, said trunnions being received in the end sockets of the said wheels, and whereby the wheels are rotatably supported. It will be noted that the end portion of the block 31 which engages with the teeth of the driving wheel is somewhat deeper than the end which engages the driven wheel, thereby permitting the said block to engage with the driving wheel slightly in advance of the engagement with the driven wheel, resulting in a more proper clutching, and insuring a more positive and quick drive to the driven elements.

Between the wheels 19 and 14 is a disk 41, of identical construction to that described in connection with the disk 23, said disk 41 having the solid portion 42, and the ring portion 43, with the spring pressed stem 44, having the block 45 movable in the notch 46, of the disk, and into and out of engagement with the teeth of the wheels 19 and 14. This disk also has the lever 47 pivotally mounted therein and projecting through the opening 48, in the ring portion, and engaging the pin 49 of the stem 44.

Disposed between the disks 23 and 41, and in parallel relation to the shafts, is a short rock shaft 50. Pivotally supported on this shaft are the two oppositely extending arms 51 and 52, the former of which extends to the disk 23 and engages with the projecting end of the lever 37, to rock the same and cause the block 31 to be projected out of engagement with the teeth of the wheels 13 and 20, whereby the shaft 10 will be permitted to rotate, and the shaft 17 to remain stationary, as will also the disk 23. The other arm 52 extends into engagement with the lever 47, and maintains the block 45 out of engagement with the wheels 14 and 19, and the disk 41 and the shaft 18 against rotation. Mounted on the shaft 50 is a rocker 54, the opposite ends of which turn upwardly and lie against the lower edge faces of arms 51 and 52. Pivotally connected to one end of the rocker 54 is a link 55, which has its other end adapted for connection with a governor (not shown), of the centrifugal type, and whereby the link 55 will be moved upwardly or downwardly. The downward movement of the link 55 results in the rocking of the rocker 54, and the raising of the arm 51 from engagement with the lever 37, whereupon the spring of the stem 30 will draw the block 31 inwardly and clutch the shaft 10 to the shaft 17. The shaft will then be driven to accomplish the work it is intended to do. Upon upward movement of the link 55, the arm 51 is permitted to fall into position to engage and rock the lever 37, which will throw the block 31 out of engagement with the wheels 13 and 20, and permit the shaft 10 to continue to rotate and the shaft 17 to remain stationary. When the governor rotates at a speed below normal, the link 55 will be pushed up causing the rocker 54 to lift the other arm 52, and release the lever 47, with the result that the shafts 11 and 18 will be clutched together and the latter driven to perform its work. The parts are restored to normal position after the work is performed, in the same manner as before described, except that it is necessary for the governor to speed up to the point where it will push the link 55 downwardly to a sufficient distance to rock the rocker and permit the arm 52 to fall into the path of the lever 47.

What is claimed is:

1. The combination with a driving shaft and a driven shaft, of a rotatable element disposed between the shafts and rotatably supporting the adjacent ends of the shafts, toothed members on the shafts on opposite sides of the rotatable element, means on the rotatable element for movement radially thereof into and out of simultaneous engagement with the toothed members, and in constant engagement with the rotatable element, said means being normally and yieldably urged toward engaging position with the toothed members, means for normally holding the radially movable means out of engagement with said toothed members, and means for automatically releasing the said holding means.

2. The combination with a driving shaft and a driven shaft, of a disk rotatable between the shafts and rotatably supporting the adjacent ends of the shafts, a toothed member on each of the shafts and arranged at opposite sides of the disk, a coupling member slidably mounted on the disk and movable into and out of simultaneous engagement with the toothed members, means for yieldably urging the coupling member toward engaged position, means for moving and holding the coupling member out of engaged position, and releasable means for holding the said moving and holding means.

3. The combination with a driving shaft and a driven shaft, of peripherally toothed wheels on the adjacent ends of the shafts and disposed in parallel planes, a disk disposed between the toothed wheels and of greater diameter than the toothed wheels, means on the disk for supporting the adjacent ends of the shafts, a block slidable radially in the periphery of the disk for engagement, simultaneously with the teeth of the toothed wheels, yieldable means for normally urging the block toward tooth engaging position, means on the disk for holding the block out of tooth engaging position, and means for releasing the block for engagement with the teeth of the toothed wheels.

4. The combination with a driving shaft and a driven shaft, of peripherally toothed disks carried by the adjacent ends of said shafts, a disk disposed between the toothed disks and rotatably supporting the said shaft ends, the periphery of the intermediate disk having a transverse notch, a block slidable in the notch radially of the disk, a rod on the block slidable in the disk, a spring for normally urging the block inwardly toward engagement with the teeth of the outer disks, an arm mounted on the intermediate disk and having an end projecting beyond the periphery thereof and an end engaged with the rod, and means releasably engaged with the outer end of the arm for normally rocking the same to hold the block out of engagement with the teeth of the toothed disks.

In testimony whereof, I affix my signature.

ERNEST J. KOHMAN.